United States Patent
Trifilo et al.

(12)

(10) Patent No.: US 6,815,921 B1
(45) Date of Patent: Nov. 9, 2004

(54) HIGH PERFORMANCE MOTOR CONTROL WITH FEEDFORWARD BUS SUPPLY VOLTAGE

(75) Inventors: Timothy M. Trifilo, Walden, NY (US); Jeffrey R. Biamonte, Hyde, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 10/465,453

(22) Filed: Jun. 17, 2003

(51) Int. Cl.[7] .............................................. G05B 11/28
(52) U.S. Cl. ..................... 318/599; 318/434; 318/138
(58) Field of Search ................................. 318/599, 434, 318/138, 778, 799, 811, 780, 798, 800, 801, 808, 810, 812

(56) References Cited

U.S. PATENT DOCUMENTS

| | | | |
|---|---|---|---|
| 4,926,104 A | | 5/1990 | King et al. |
| 6,541,933 B1 | * | 4/2003 | Leggate et al. ............. 318/599 |
| 6,657,322 B2 | * | 12/2003 | Skibinski et al. ........... 307/105 |
| 2003/0062868 A1 | * | 4/2003 | Mir et al. .................... 318/599 |
| 2003/0090227 A1 | * | 5/2003 | Ito .............................. 318/434 |

* cited by examiner

Primary Examiner—Karen Masih
(74) Attorney, Agent, or Firm—Floyd A. Gonzalez; Cantor Colburn LLP

(57) ABSTRACT

A system for controlling a motor comprising: a voltage source including a voltage sensor for detecting a voltage of the voltage source; a motor in operable communication with an inverter, the motor responsive to a command signal from the inverter, the inverter is in operable communication with the voltage source and a controller. The inverter includes a plurality of switching devices configured to receive a command from a controller and generate a voltage command to the motor. The system also includes a controller in operable communication with the inverter and the voltage sensor; the controller configured provide a command to the inverter responsive to the voltage of the voltage source.

16 Claims, 4 Drawing Sheets

HIGH PERFORMANCE MOTOR CONTROL WITH FEEDFORWARD BUS SUPPLY VOLTAGE

FIELD OF THE INVENTION

This invention relates generally to a motor controller. More specifically, to applications providing feedforward supply voltage for a sensorless or sensored motor controllers to maintain improved speed regulation.

BACKGROUND

Speed regulation in motor controllers is often achieved by determining or measuring the speed of the motor and utilizing the speed in one ore more controller loops. For example, in some systems speed may be measured using a speed measuring sensor such as a tachometer. Speed sensors, or detectors of various types are well known in the art. In recent years the application of speed detection to motor control functions has stimulated demands on the sophistication of these sensors. In other systems, motor speed may be computed by evaluating the time rated of change of a position of the motor. In some systems motor speed may be estimated employing computational methodologies based on motor parameters and the like without employing a speed sensor.

One technique to estimate speed is known as sensorless commutation whereby a DSP (digital signal processor) or ASIC (application specific integrated circuit) integrates motor back-EMF of a non driven phase in a classic two-phase-on brushless DC (BLDC) system to derive an error signal. Unfortunately, such a system can only update (re-compute) a speed value during the neutral transition of each commutation state, at best. In PWM (pulse width modulated) systems, this signal is averaged over many commutation intervals which makes speed updates even less frequent.

Speed regulation for a motor is achieved where speed is known or estimated with sufficient accuracy. FIG. 1 depicts an existing motor control system with motor speed feedback. With this configuration for a controller, a speed variation must be resolved and then fed back to the a controller for the appropriate control corrections. Such corrections take time and as a result a speed deviation is experienced. It will also be appreciated that in such a system, where a direct current (DC) bus supply is employed, in the presence the DC bus voltage disturbance will result in a deviation of the voltage supplied to the motor and thereby, a speed variation. In this situation, when a disturbance of the DC bus voltages results in a motor speed disturbance, the speed disturbance is not detected until the speed sensor (or speed estimation algorithm) can resolved and ascertain the changing speed. As a result the motor speed is disturbed as the DC bus voltage varies. Such a variation in motor speed is often undesirable and may be unacceptable is some systems. In other words, to compensate for speed variations, a the motor control system must wait for the sensor to make the next mechanical revolution to determine speed. If a DC bus disturbance has compromised speed, it will not be known until the sensor indicates so. It should be noted that some systems use multiple sensors, e.g., a sensor every n degrees, to acquire more frequent updates. Therefore, a system and methodology for controlling motor speed more directly responsive to DC bus voltage is needed.

BRIEF SUMMARY OF AN EXEMPLARY EMBODIMENT

Disclosed herein in an exemplary embodiment is a system for controlling a motor comprising: a voltage source including a voltage sensor for detecting a voltage of the voltage source; a motor in operable communication with an inverter, the motor responsive to a command signal from the inverter, the inverter is in operable communication with the voltage source and a controller. The inverter includes a plurality of switching devices configured to receive a command from a controller and generate a voltage command to the motor. The system also includes a controller in operable communication with the inverter and the voltage sensor; the controller configured to provide a command to the inverter responsive to the voltage of the voltage source.

Also disclosed herein in another exemplary embodiment is a method for controlling a motor comprising: receiving a voltage signal indicative of a voltage on a voltage source; receiving a speed command indicative of a desired speed for a motor; generating a voltage command to control a speed of the motor based on the voltage signal and the speed command; and the generating includes a feedforward voltage regulation function responsive to the voltage signal.

BRIEF DESCRIPTION OF THE DRAWINGS

These and other objects and advantages of the present invention may be best understood by reading the accompanying detailed description of the exemplary embodiments while referring to the accompanying figures wherein like elements are numbered alike in the several figures in which.

The detailed description explains the preferred embodiments of our invention, together with advantages and features, by way of example eith reference to the drawings.

DETAILED DESCRIPTION OF THE EXEMPLARY EMBODIMENTS

Disclosed herein in an exemplary embodiment is an apparatus and methodology that enables a motor controller to achieve significantly higher speed and power regulation performance than traditional motor drives. The exemplary embodiment disclosed herein solve the above-mentioned problem of erratic variation in motor speed and torque caused by sudden fluctuation in DC bus voltage by actively sampling the DC bus voltage and DC bus current and using this data a vary drive parameters instantaneously. As should be appreciated, a speed regulation loop may readily compensate for these fluctuations, however, such techniques can only compensate for a speed variation resultant from a change in bus voltage when the speed has already changed due to the fluctuation. The methodology disclosed herein operates in cooperation with speed and current regulation loops of a motor control system to provide instantaneous response to bus voltage fluctuations without the need to wait for speed and torque to be compromised.

Figure 1:
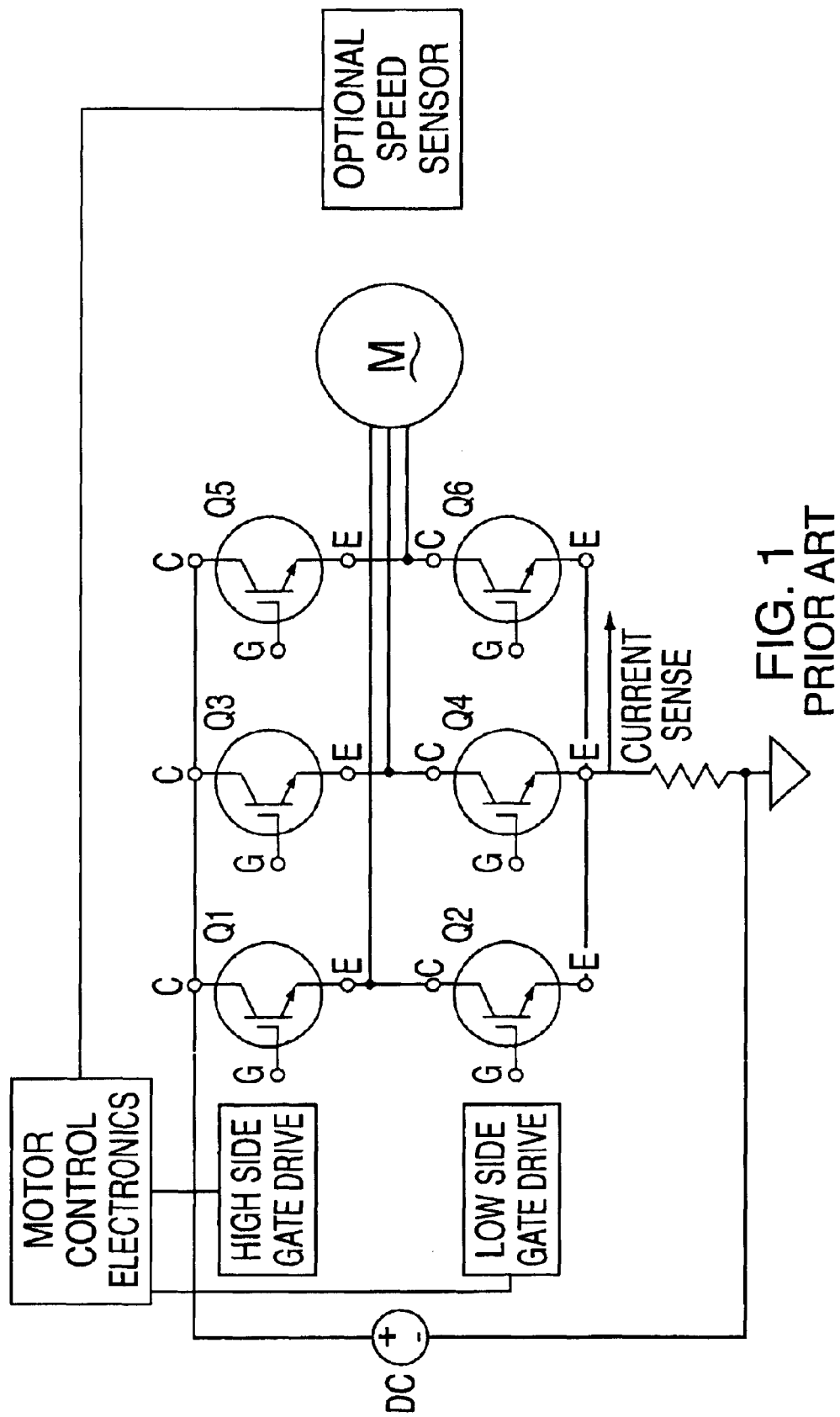
FIG. 1 depicts an existing motor control system with optional motor speed feedback.
Figure 2:
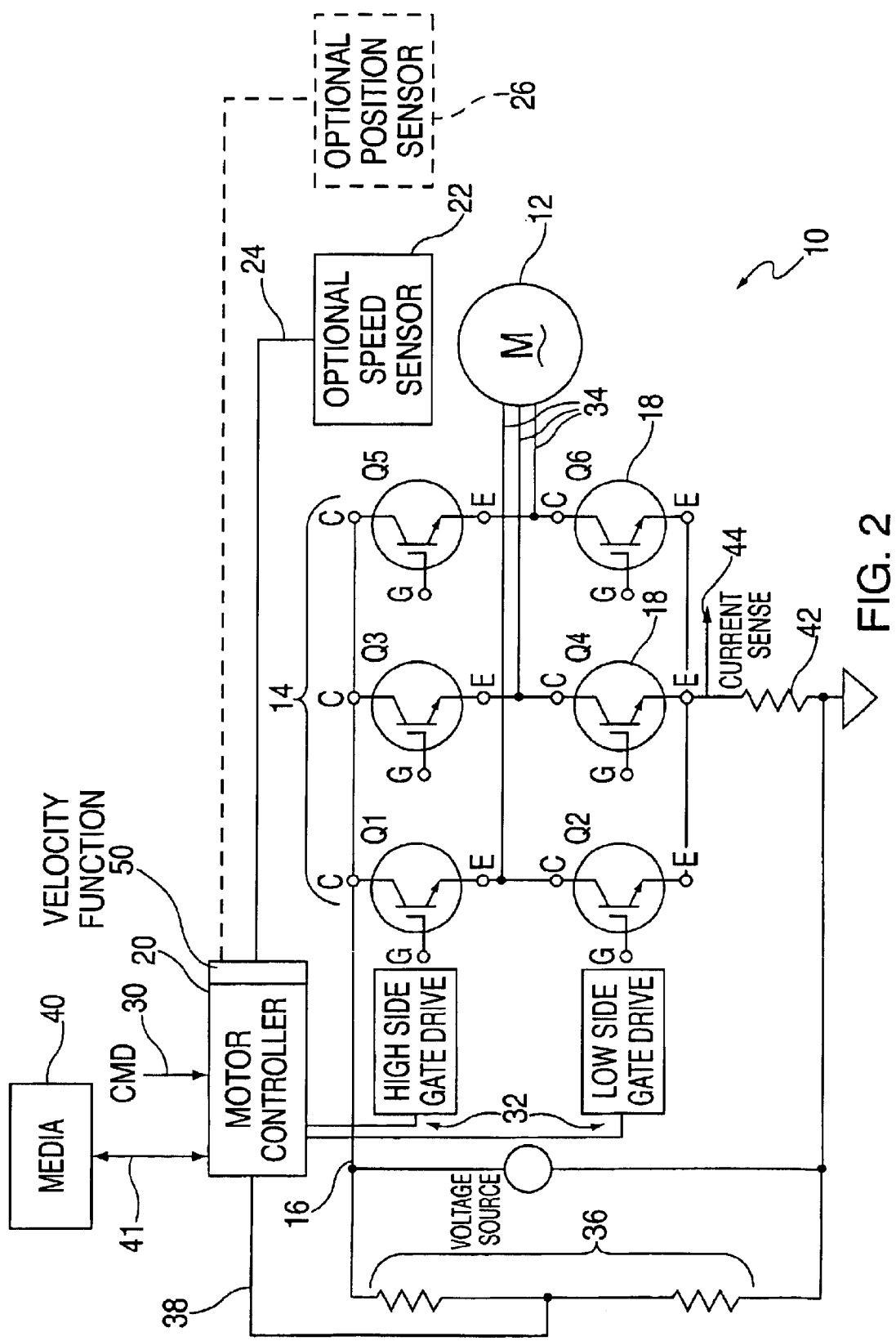
FIG. 2 depicts motor control system with optional motor speed feedback and bus voltage feedforward control in accordance with an exemplary embodiment.

Referring now to FIG. 2, a motor control system 10 with optional motor speed feedback and bus voltage feedforward control is depicted in accordance with an exemplary embodiment. The system 10 includes, but is not limited to a motor 12, driven by an inverter 14 from a power source, e.g.

DC voltage bus 16. In an exemplary embodiment a three-phase brushless DC motor is employed. However, it should be appreciated that the invention as disclosed herein is readily applicable to other motor controls systems utilizing a variety of voltage supplies whether AC or DC. In an exemplary embodiment the inverter 14 comprises 6 switching devices 18. The switching devices 18 may be transistors, junction transistors, Field Effect transistors (FETs), Insulated Gate Bipolar Transistors (IGBTs), Silicon Controlled Rectifiers (SCR), and Triacs solid state relays and the like, as well as combinations including at least one of the foregoing.

Once again, while a six switching device 18 inverter 14 is depicted, other control configurations are possible depending upon the configuration of the motor 12 employed. The system 10 also includes a controller 20.

The controller 20 is employed to develop the correct voltage needed to produce the desired torque, position, and/or speed of the motor 12. In order to perform the prescribed functions and desired processing, as well as the computations therefore (e.g., the control algorithm(s), and the like), the controller 20 may include, but not be limited to, a processor(s), computer(s), memory, storage, register(s), timing, interrupt(s), communication interface(s), and input/output signal interfaces, and the like, as well as combinations comprising at least one of the foregoing. For example, controller 20 may include signal input signal filtering to enable accurate sampling and conversion or acquisitions of such signals from communications interfaces. It should also be appreciated that while in an exemplary embodiment the inverter 14 and controller 20 are described as separate, in some embodiments, it may desirable to have them integrated as a single component. Additional features of controller 20 are thoroughly discussed at a later point herein.

An optional motor velocity sensor 22 is connected to the motor 12 to detect the angular velocity of the motor. The velocity sensor 22 may sense the velocity based on optical detection or magnetic field variations, and the like. The velocity sensor 22 outputs a velocity signal 24 indicating the angular velocity of the motor 12. Alternatively, a position sensor may be employed to determine the position of the motor. The optional motor position sensor 26 is connected to the motor 12 to detect the angular position of the motor. The position sensor 26 may sense the position based on optical detection or magnetic field variations, and the like. The position sensor 26 outputs a position signal 28 indicating the angular position of the motor 12.

The optional position signal 26, may be applied to a velocity determining function 50 or process to determine the velocity of the motor 12. The function 50 may, for example, include a counter that counts position signal pulses (for a position encoder) for a predetermined duration. The count value is proportional to the speed of the motor. For example, if a counter counts the position signal pulses in time intervals of 5 milliseconds and the encoder has a resolution of 2.5 degree, the speed measurement will have a resolution of about 41.7 rpm. The speed signal 24 may also be obtained as the derivative of the position signal 26 from the equation $\omega_m = \Delta\theta_m/\Delta t$ where $\Delta t$ is the sampling time and $\Delta\theta_m$ is the change in position during a sampling interval. This process is a method of extracting a digital, derived velocity value based on a per sample period of change of the position signal 26. The process computes the velocity signal by determining a delta position computed by subtracting the position signal delayed by one sample from the current position signal value. That is, subtracting the last sampled or measured position from the current position. The position difference is then divided by the difference in time between the two samples. An equation illustrating the computation is as follows:

$$\text{Delta} = \frac{P_0 - P_{-1}}{T_0 - T_{-1}}$$

In an exemplary embodiment of the above equation evaluates a changing measured position over a fixed interval of time to perform the computation. It will be appreciated by those skilled in the art, that the computation may be performed with several variations. An alternative embodiment, evaluates a changing measured time interval for a fixed position change to perform the computation. Further, in yet another embodiment, both the interval of time and interval position could be measured and compared with neither of the parameters occurring at a fixed interval. In another exemplary embodiment a filter further processes the calculated velocity value. Where the filtering characteristics are selected and determined such that the filter yields a response sufficiently representative of the true velocity of the motor 12 without adding excessive delay. One skilled in the art will appreciate and understand that there can be numerous combinations, configurations, and topologies of filters that can satisfy such requirements. A preferred embodiment may employ a four-state moving average filter.

Continuing with FIG. 2, the power source 16 e.g., DC voltage supply bus, is sensed with a bus sensor 36 and a bus voltage signal 38 is transmitted to the controller 20. In an exemplary embodiment the bus sensor 36 comprises two series resistors in a voltage divider applied across the power source 16. The divided voltage signal therefrom forming the bus voltage signal 38. The system 10 also includes a current sensor 42 for sensing the total motor current and transmitting a current signal 44 to the controller 20. It will be appreciated that numerous other circuit configurations and apparatusses for sensing the bus voltage, current and the like are possible. For example, resistor networks, potentiometers, sensing components, optical detectors, magnetic feedback devices e.g., transformers and the like, as well as combinations including at least one of the foregoing.

Returning to FIG. 2, the optional position signal 28, and/or optional speed signal 24, bus voltage signal 38, and command signal 30 are applied to the controller 20. The command signal 30 is indicative of the desired motor torque, position, speed and the like. The controller 20 determines gate drive commands develop the desired torque, position speed using the signals 30, 26, 28, 38, 44, and other fixed motor parameter values. Gate drive command signals 32 of the controller 20 are applied to the inverter 14, which is coupled with the power source or bus 16 to apply phase voltages 34 to the stator windings of the motor 12 in response to the gate drive command signals 32.

Figure 3:
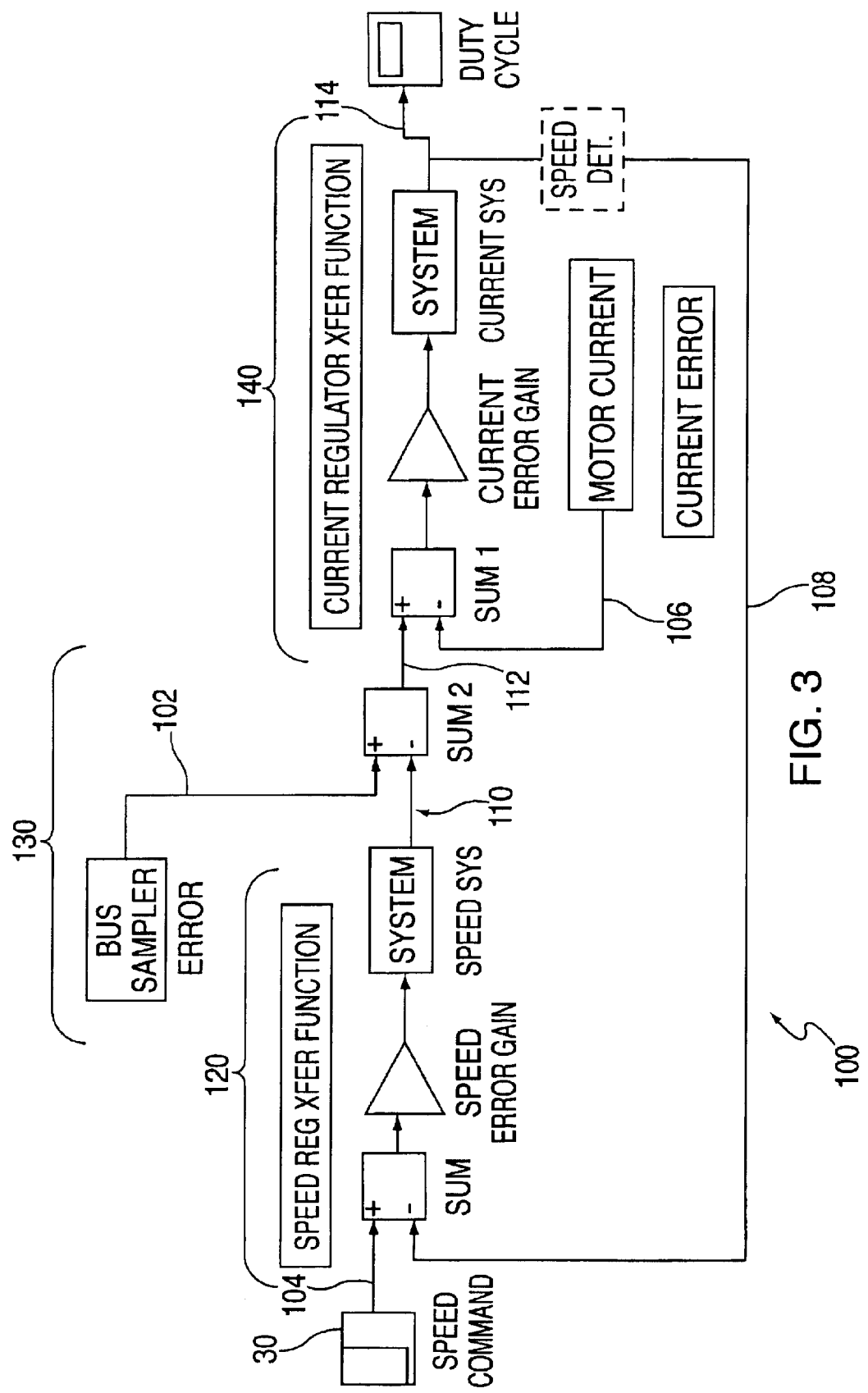
FIG. 3 depicts a simplified d block diagram of a motor control algorithm in accordance with an exemplary embodiment.

Turning now to FIG. 3, a simplified block diagram of a motor control algorithm 100 in accordance with an exemplary embodiment is depicted. The algorithm 100 receives as its input, a value indicative of the voltage of the power source 16, denoted as 102, a value indicative of a speed command denoted as 104, e.g. command 30, a value indicative of a measured motor current from current sensor 42, denoted 106, and a value indicative of a measured motor velocity denoted 108, whether computed or from velocity sensor 22. In an exemplary embodiment a value indicative of the measured motor velocity is computed from the motor voltage. It will be appreciated that the velocity and motor voltage are substantially proportional. In an exemplary embodiment, the algorithm is configured with a speed regulation function 120, a voltage regulation function 130, and a current regulation function 140. The speed regulation function 120 comprises what would be termed an "outer" loop, the voltage regulation function 130 comprises what would be termed a feedforward path, while the current regulation function 140 would be termed an "inner" loop. When there are fluctuations in DC bus voltage, this additional regulator takes over to maintain constant rotor power, thereby maintaining speed more accurately. Advantageously, an added feature of an exemplary embodiment is that ripple current is significantly reduced during normal minor fluctuations, in that the current increase now becomes more gradual, avoiding the sudden increases previously associated with a determination of a low speed for the motor 12.

Continuing with FIG. 3, the speed regulation function 120 receives as an input the speed command value 104 and motor velocity value 108. The speed command value 104 is compared with the motor velocity value 108, the result is scaled, compensated and processed to formulate a first current command, denoted 110. In an exemplary embodiment the power source 16 voltage value 102 is combined with the first current command 110 to form a desired current command denoted as 112. In one embodiment the combination is a simple summation, however the signals could also include additional scaling, compensation, processing, and the like, as well as combinations thereof. Moreover, other methodologies of feedforward application of the bus voltage are possible. Turning now to the current regulation function 140, in an exemplary embodiment, the current regulation function 140 receives as an input the desired current command 112 and the motor current value 106. The desired current command 112 is compared with the motor current value 106. The resultant of the comparison is scaled, compensated, and processed to formulate a voltage command 114 to the motor 12. It will be appreciated in a pulse width modulated system as depicted, the pulse width is based on this voltage command. With other types of motors and motor control systems different implementations are possible. In any instance, however, the commands to the motor 12 would be directly based on such a voltage command 114.

Figure 4B:
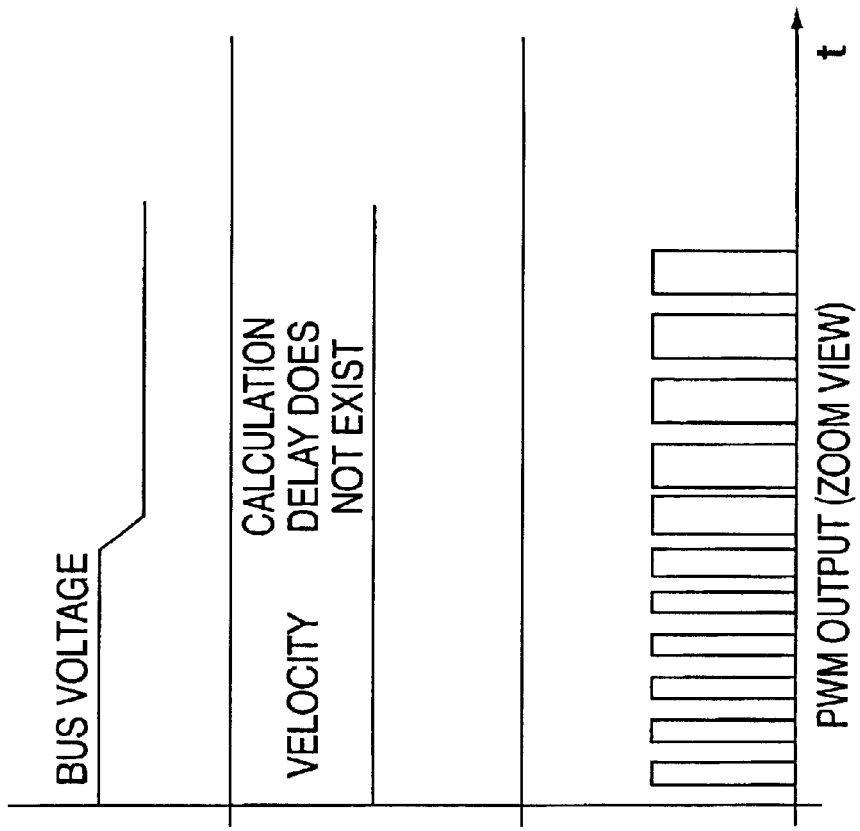
FIGS. 4A and 4B depict a comparison of control system response when an exxemplary embodiment is employed.
Figure 4A:
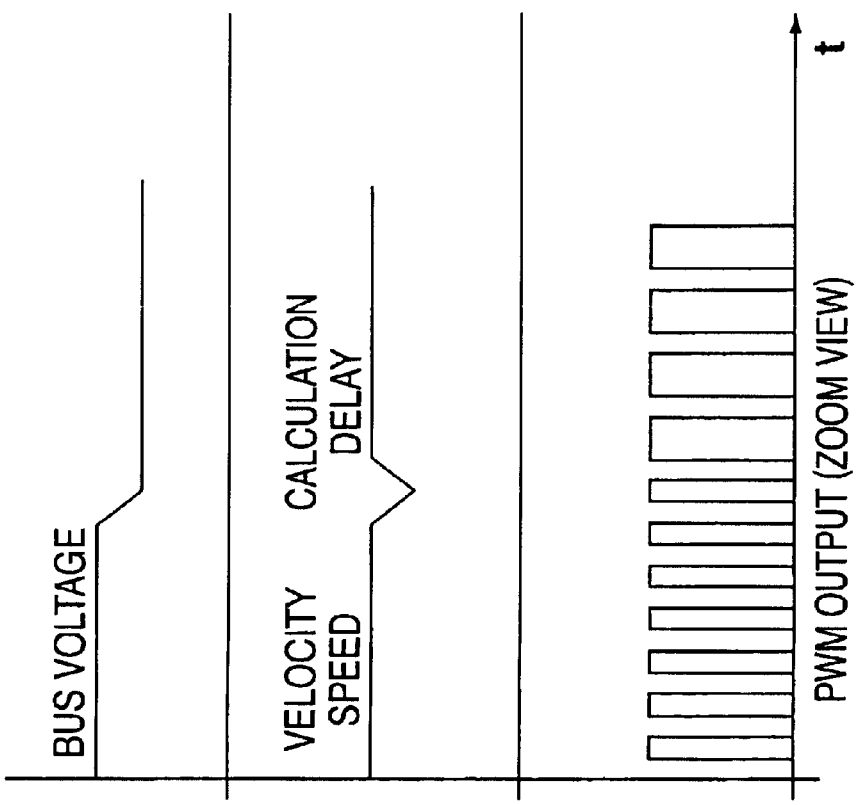

FIGS. 4A and 4B depict an illustrative comparison of an existing motor control system to that of the motor control system 10 of an exemplary embodiment for a given disturbance in the supply voltage. It will be appreciated that in FIG. 4A a finite delay is experienced to detect the impact on motor velocity before the motor commands (in this instance a pulse width modulated command) is increased. On the other hand, in FIG. 4B, employing an exemplary embodiment, the motor command is gradually increased as the bus voltage decreases an a speed disturbance is avoided.

It should be noted that the exemplary embodiments as disclosed herein provide for a sensorless or sensored motor controller to maintain improved regulation over existing designs. This is desirable in all applications, and may actually be critical in some application such as medical instrumentation and disk storage systems. Moreover, the invention is readily applicable to all motor and motor controller types including, but not limited to, DC, AC, Brush, and Brushless.

It will be appreciated, that the controller functionality described herein is for illustrative purposes. The processing performed throughout the system may be distributed in a variety of manners. For example, distributing the processing performed in the controller 20 among the other controllers, and/or processes employed may eliminate a need for such a component or process as described. Each of the elements of the systems described herein may have additional functionality as described in more detail herein as well as include functionality and processing ancillary to the disclosed embodiments. As used herein, signal connections may physically take any form capable of transferring a signal, including, but not limited to, electrical, optical, or radio. Moreover, conventional torque, position, and/or velocity control of a motor may utilize a feedback control system to regulate or track to a desired torque, position, and/or velocity. The control law maybe a proportional, integrative or derivative gain on the tracking error or may be a more sophisticated higher-order dynamic. In either case, the feedback measurement may be estimated or an actual position/velocity and in some cases, it's derivatives.

The system and methodology described in the numerous embodiments hereinbefore provides a robust means to control a motor with feedforward bus supply voltage. In addition, the disclosed invention may be embodied in the form of computer-implemented processes and apparatuses for practicing those processes. The present invention can also be embodied in the form of computer program code containing instructions embodied in tangible media 40, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or as data signal 41 transmitted whether a modulated carrier wave or not, over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

It will be appreciated that the use of first and second or other similar nomenclature for denoting similar items is not intended to specify or imply any particular order unless otherwise stated.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A system for controlling a motor comprising:
   a voltage source including a voltage sensor for detecting a voltage of said voltage source;
   a motor in operable communication with an inverter, said motor responsive to a command signal from said inverter, said inverter is in operable communication with said voltage source and a controller, wherein said inverter includes a plurality of switching devices configured to receive a command from a controller and generate a voltage command to said motor; and a controller in operable communication with said inverter and said voltage sensor; said controller configured to provide a command to said inverter based on a feedforward voltage regulation function responsive to said voltage of said voltage source.

2. The system of claim 1 further including a velocity sensor in operable communication with said motor, said velocity sensor transmitting a velocity signal to said controller indicative of a velocity of said motor, wherein said command is further responsive to said velocity signal.

3. The system of claim 1 further including a position sensor in operable communication with said motor, said position sensor transmitting a position signal to said controller indicative of a position of said motor, wherein said command is further responsive to at least one of said position signal and a velocity value computed therefrom.

4. The system of claim 1 further including a current sensor in operable communication with at least one of said motor and said inverter, said current sensor transmitting a current signal to said controller indicative of a current utilized by said motor, wherein said command is further responsive to said current signal.

5. The system of claim 1 wherein said motor is at least one of a three-phase brushless DC motor, a DC brush motor, and an AC motor.

6. The system of claim 1 wherein said voltage source comprises at least one of an AC voltage source and a DC voltage source.

7. The system of claim 1 wherein said switching devices include at least one of transistors, junction transistors, Field Effect transistors (FETs), Insulated Gate Bipolar Transistors (IGBTs), Silicon Controlled Rectifiers, and Triacs.

8. A method for controlling a motor comprising:

receiving a voltage signal indicative of a voltage on a voltage source;

receiving a speed command indicative of a desired speed for a motor;

generating a voltage command to control a speed of said motor based on said voltage signal and said command; and wherein said generating includes a feedforward voltage regulation function responsive to said voltage signal.

9. The method of claim 8 further including receiving a velocity signal indicative of a velocity of said motor and wherein said voltage command is further responsive to said velocity signal.

10. The method of claim 9 wherein said generating includes a speed regulation function responsive to said velocity signal and said speed command.

11. The method of claim 10 wherein said speed regulation function generates a current command.

12. The method of claim 8 further including receiving a position signal indicative of a position of said motor, wherein said voltage command is further responsive to at least one of said position signal and a velocity value computed therefrom.

13. The method of claim 8 further including receiving a current signal indicative of a current utilized by said motor, wherein said voltage command is further responsive to said current signal.

14. The method of claim 13 wherein said generating includes a current regulation function responsive to said current signal and a desired current command.

15. The method of claim 8 wherein said voltage regulation function generates a desired current command.

16. The method of claim 8 wherein said voltage command corresponds to a duty cycle command for a gate drive of an inverter in operable communication with said motor.

* * * * *